(12) United States Patent
Ballard

(10) Patent No.: US 6,473,756 B1
(45) Date of Patent: Oct. 29, 2002

(54) METHOD FOR SELECTING AMONG EQUIVALENT FILES ON A GLOBAL COMPUTER NETWORK

(75) Inventor: Clinton L. Ballard, Suquamish, WA (US)

(73) Assignee: Acceleration Software International Corporation, Poulsbo, WA (US)

(*) Notice: Subject to any disclaimer, the term of this patent is extended or adjusted under 35 U.S.C. 154(b) by 0 days.

(21) Appl. No.: 09/330,676

(22) Filed: Jun. 11, 1999

(51) Int. Cl.$^7$ ............................................... G06F 17/30
(52) U.S. Cl. ................................................ 707/6; 707/3
(58) Field of Search ................................ 707/6, 1–100, 707/3, 4, 5, 10, 505.1, 203, 227

(56) References Cited

U.S. PATENT DOCUMENTS 6,192,372 B1 * 2/2001 Yamaura et al. ............... 707/1
6,278,466 B1 * 8/2001 Chen ........................... 345/473
2001/0014891 A1 * 8/2001 Hoffert et al. ............ 707/104.1

* cited by examiner

*Primary Examiner*—Safet Metjahic
*Assistant Examiner*—Apu M Mofiz
(74) *Attorney, Agent, or Firm*—Steven P. Koda, Esq.

(57) ABSTRACT

A file among equivalent files identified during a search of a global computer network is selected to be downloaded to a local computer. Equivalent files are found frequently where different copies of the same song are stored many times on a global computer network. A portion of all or a subset of the equivalent files are screened during a brief trial download period. Because the files are expected to be located at different sites, the bandwidth of the pathways to the respective files may vary. Amongst other criteria, the file with the best download performance during the trial time period is selected to be downloaded in its entirety.

25 Claims, 4 Drawing Sheets

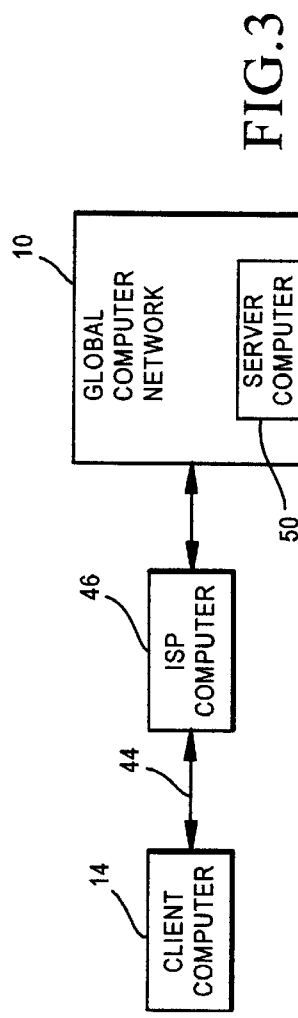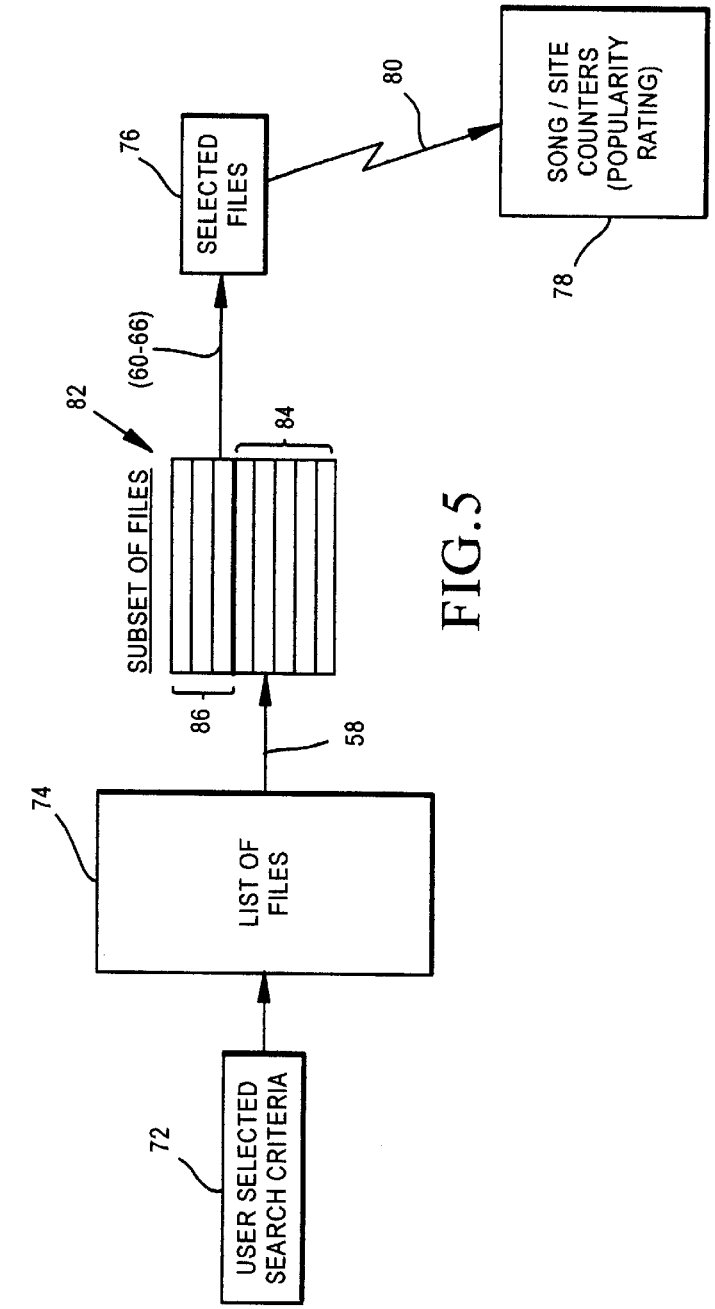

METHOD FOR SELECTING AMONG EQUIVALENT FILES ON A GLOBAL COMPUTER NETWORK

BACKGROUND OF THE INVENTION

This invention relates to search methodologies and search engines for retrieving information from a global computer network. More particularly, this invention relates to a method for selecting among equivalent files, documents, pages or other information resources on a global computer network.

Global computer networks, such as the INTERNET and its World Wide Web (WWW), store data in many formats among many different sites. There are text files, binary files, audio files, video files, multimedia files, and other types of data files and executable files. The data typically is stored in a file format, but also is referred to as a page, document, graphic, video clip, audio clip, program, or data base. All of these formats of storing information on a global computer network, and other formats for storing data on such a network, are referred to herein as a data file unit, or simply, a file.

A common way of finding and accessing information of unknown location on a global computer network is to use a search engine. There are many conventional search engines available on the WWW that allow one to log onto a search site and execute a search engine. The user typically inputs parameters and/or keywords to define what the search engine is to look for. Some search engines organize resources on the WWW into categories and allow one to limit the search to files organized under the category. Some allow searching only of web site titles, or keywords from a web site or other resource.

Common search engines for searching among digitized audio files are MP3-based search engines. MP3 refers to a conventional encoding standard defining the formats for recording and storing audio files in digital format. There are many MP3 audio files which may be accessed and downloaded from the global computer network. For example, many songs and other audio works are stored on the global computer network. In particular it is common for there to be many different copies of the same audio work located at different sites on a global computer network. Accordingly, there is a need for selecting which copy to select from the many equivalent copies of the same audio work.

As used herein 'equivalent copy' means identical and non-identical copies of the same audio work. Such copies may be different because they resulted from different digital encodings of the same audio work (e.g., different MP3 encoding bit rate, mono versus stereo encoding). Further, by 'same audio work' it is meant the same song as performed by the same artist in a given performance or prerecorded event, (e.g., ultimately derived from a common master or duplicate master; a 'dubbing;' one of many 'bootlegs' of the same performance). For example, several end users may have an analog audiotape of a song. Such audiotape copies may be derived from a common master or duplicate master. Different operators may own digital encoding equipment which allows them to record the song in digital format and upload it onto the global computer network. Such uploaded files are two equivalent copies, as the term equivalent is used herein. Even if the operators use the same kind of encoder system or a different encoder system or the same or a different encoding protocol, the uploaded files are considered herein as being equivalent.

For some embodiments, 'equivalent copy' also may mean the identical and nonidentical copies of a similar audio work of the same song. For example, copies of the same song by the same artist from different performances or prerecorded masters (i.e., different versions of same song by the same artist). Or in another example, 'equivalent copies' also may mean copies of the same song as performed by different artists.

SUMMARY OF THE INVENTION

According to the invention, at least one file among equivalent files (preferably equivalent audio files) identified during a search of a global computer network are selected to be downloaded to a local computer.

According to one aspect of the invention, a plurality of the equivalent files are begun to be downloaded to the local computer for a brief trial period. Such period is predetermined empirically and is expected to be less than the time required to download the entire contents of a file. Typically the equivalent files are located at different sites on the global computer network. The bandwidth of the data pathway from the local computer to these different sites may vary. The performance of these different pathways is estimated based upon the throughput bandwidth for the downloading process during the trial period.

According to another aspect of the invention, there are multiple criteria for selecting one of the equivalent files to completely download at an end user computer. First, with regard to files for which downloading attempts result in a message "file not found" (or a similar message), the files are eliminated from consideration. Second, there may be some selectable parameters which may be automatically set or adjusted by the end user (e.g., stereo versions only; server must support 'resume', stereo versus mono version, MP3 encoding bit rate). Third, the downloading bandwidth determined for the trial period is to be an acceptable bandwidth.

According to another aspect of the invention, there is a minimum desired throughput bandwidth. Any of the equivalent files downloaded during the trial period which meet the minimum desired throughput bandwidth are acceptable. When none are acceptable, then the equivalent file meeting the other criteria whose pathway is performing with the highest bandwidth is selected to be completely downloaded. When multiple files are acceptable and meet the other criteria, then the file whose pathway is performing with the highest bandwidth is selected to be completely downloaded.

According to another aspect of the invention, each time a file is selected to be downloaded a popularity ranking is incremented. In one embodiment the end user computer sends a message to the search web site which performs the search and which maintains the popularity counters. The counter refers to the file and its storage location on the global computer network. In some embodiments an additional counter is maintained to track the popularity of a given song, as distinct from the counter of the song/site combination.

According to another aspect of this invention, when a search lists multiple equivalent files, a number of equivalents are chosen to be evaluated. Some are chosen at random from the list returned from the search. Some are chosen because they have a song/site popularity rating. Among those selected that have a song/site popularity rating, those with the highest popularity rating are selected to be evaluated during the downloading trial period. This corresponds to copies of the song whose download pathway previously was selected.

According to another aspect of the invention, the equivalent files correspond to equivalent copies of the same audio work.

According to one advantage of this invention, a method for selecting among equivalent files meeting some threshold criteria is provided. According to another advantage of the invention, end user waiting time is reduced because an optimally-downloadable equivalent is selected to be downloaded.

These and other aspects and advantages of the invention will be better understood by reference to the following detailed description taken in conjunction with the accompanying drawings.

BRIEF DESCRIPTION OF THE DRAWINGS

FIG. 3 is a diagram of an end user computer linked to a server computer which is linked to the global computer network.

FIG. 5 is a flow chart of information input and output using the method of FIG. 4.

DESCRIPTION OF SPECIFIC EMBODIMENTS

Host Network Environment

Figure 1:
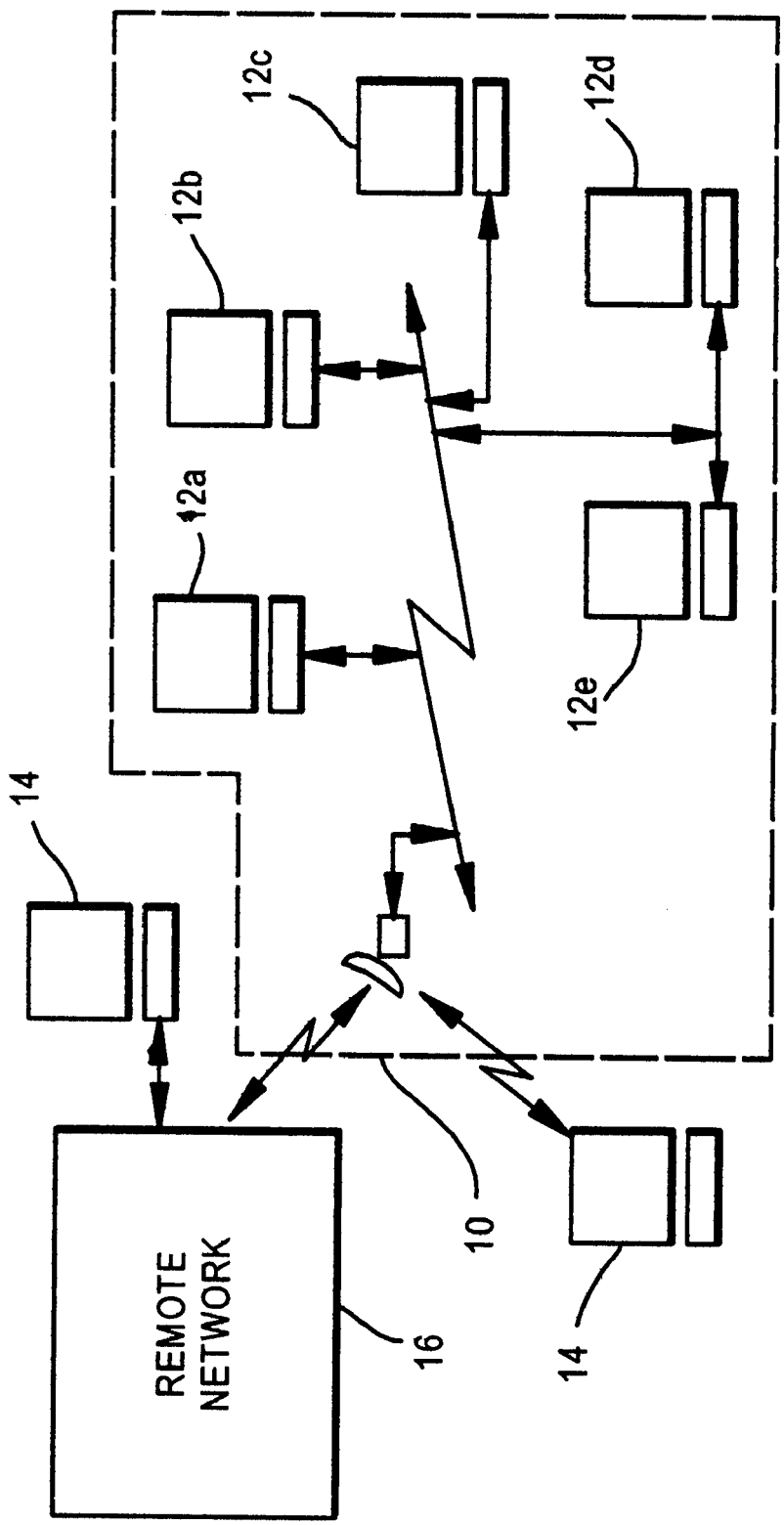
FIG. 1 is a schematic diagram of a global computer network.

FIG. 1 shows a global computer network 10 formed by a plurality of network server computers 12 which are interlinked. Each network server computer 12 stores files accessible to other network server computers 12 and to client computers 14 and networks 16 which link into the global computer network 10. The configuration of the network 10 may change over time as client computers 14 and one or more networks 16 connect and disconnect from the network 10. For example, when a client computer 14 and a network 16 are connected with the network servers computers 12, the global computer network includes such client computer 14 and network 16. As used herein the term computer includes any device or machine capable of accepting data, applying prescribed processes to the data, and supplying results of the processes.

The global computer network 10 stores information which is accessible to the network server computers 12, remote networks 16 and client computers 14. The information is accessible as files. The term file as used herein, includes files (as per the Windows operating system usage), documents (as per the MacOS operating system usage), pages (as per the web phraseology usage), and other records, entries or terminology used to describe a unit of a data base, a unit of a file system or a unit of another data or information resource. There are text files, binary files, audio files, video files, multimedia files, and other types of data files and executable files.

A client computer accesses the global computer network 10 by a wired or a wireless transfer medium. A user accesses the internet, for example, using a modem and the standard telephone communication network. Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica,. The communication services include Email, Telnet, USENET, and IRC. The multimedia information services include the World Wide Web (WWW).

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the global computer network 10 using a modem and the standard telephone communication network. Alternative carrier systems such as cable and satellite communication systems also may be used to link into the wide area network 10. Still other private or time-shared carrier systems may be used. In one embodiment the global computer network is embodied by the Internet and its World Wide Web (WWW).

The client computer 14 is any end user computer, and may also be a mainframe computer, minicomputer or microcomputer having one or more microprocessors. The remote network 16 may be a local area network, a network added into the global computer network through an independent service provider (ISP) for the internet, or another group of computers interconnected by wired or wireless transfer media having a configuration which is either fixed or changing over time. Client computers 14 may link into and access the global computer network 10 independently or through a remote network 16.

Computer System

Figure 2:
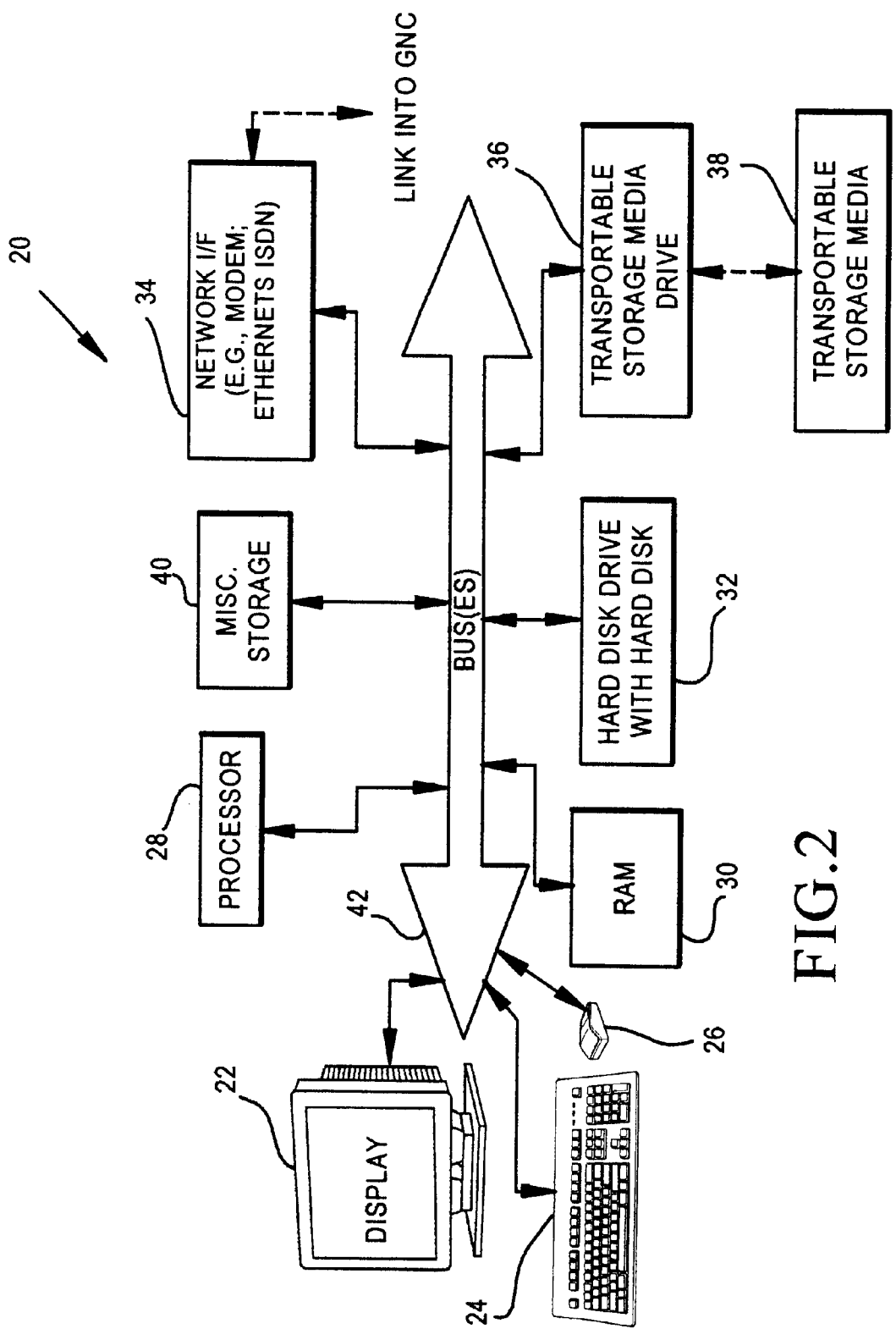
FIG. 2 is a block diagram of a computer system for a computer connected into the global computer network of FIG. 1.

The functions of the present invention preferably are performed by programmed digital computers of the type which are well known in the art, an example of which is shown in FIG. 2. A computer system 20 has a display 22, a key entry device 24, a pointing/clicking device 26, a processor 28, random access memory (RAM) 30,and a communication or network interface 34 (e.g., modem; ethernet adapter). In addition, there commonly is a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Searching the Global Area Network for Information

Referring to FIG. 3, a client computer 14 accesses the global computer network 10 such as the Internet through a service provider computer 46 (such as an Internet Service Provider—'ISP'). In some embodiments, the client computer is directly linked into the network 10. To search the global computer network 10 the user accesses a search engine at a server computer 50. There are several known search engines that search for WWW documents. These are accessed by URL identifier, and include, for example, Yahoo, Magellan, Lycos, Altavista, Looksmart, and YourPortal. There also are search engines that search for audio songs, such as the MP3 based search engines. The MP3 search engines search for audio recordings stored on the Internet in a digitized audio format. A common standard for such digitization is the MP3 encoder standard.

Figure 4:
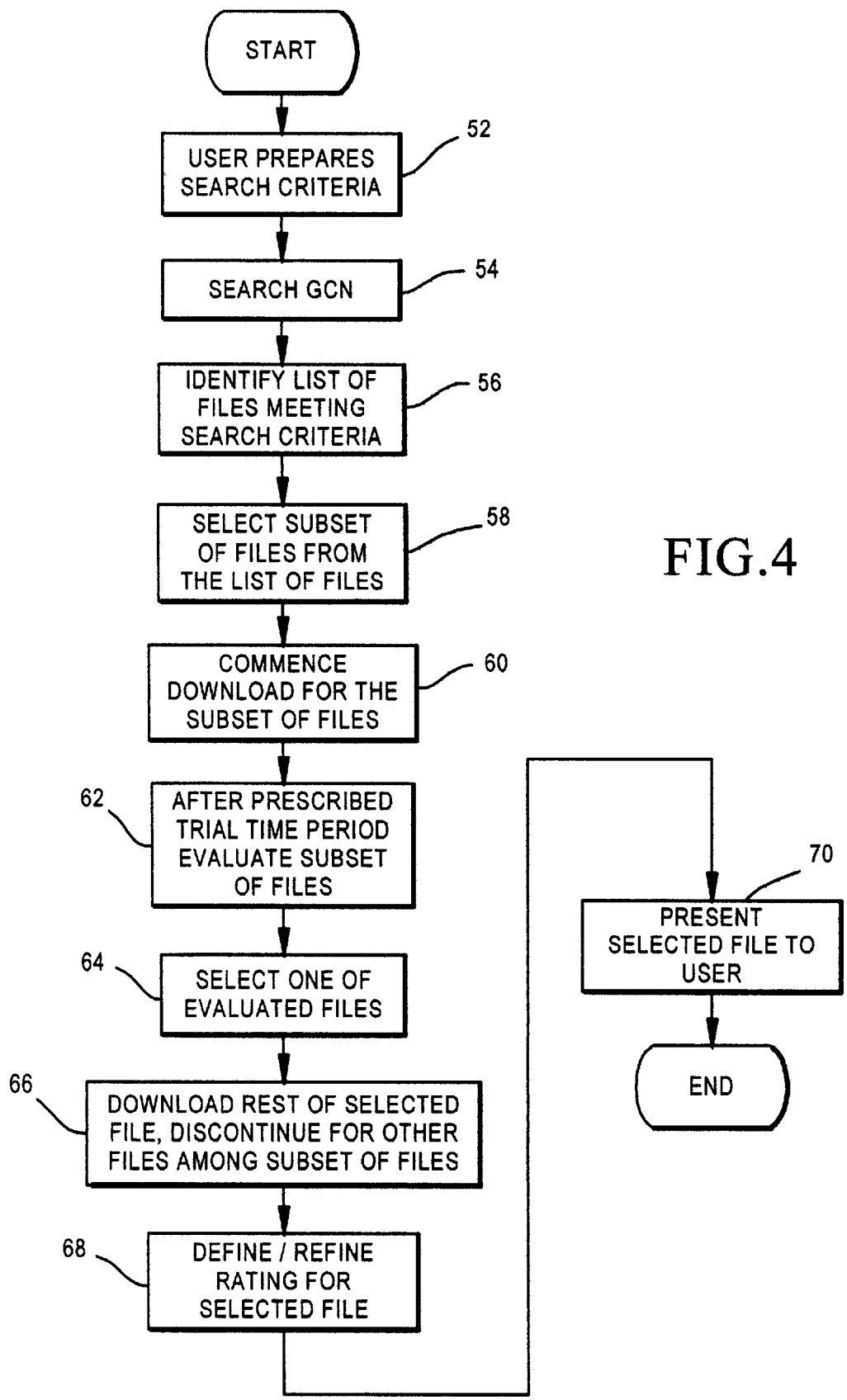
FIG. 4 is a flow chart of a method for selecting among equivalent files according to an embodiment of this invention.

In a preferred embodiment of the method of this invention, a user searches for copies of a desired song stored on the global computer network 10. In other embodiments the file need not be an audio file but instead may be another file type or a mix of file types. Referring to FIGS. 4 and 5, according to a method embodiment of this invention, at a step 52 a user accesses a search engine and enters search criteria 72. For the preferred embodiment, such criteria may include the title of a song, the performing artist, the date or place of the performance, the song writer or some other criteria used to identify a given song. Preferably only one song is identified, although the search may encompass different performances, versions or renditions of the song (e.g., by same or different artist).

At step 54 a search of the global computer network is performed using the conventional audio or other search engine. The search engine typically returns at step 56 a list 74 of the search results. The results typically include some manner of identifying the information and the information location, (e.g., a hyperlink to a URL with some brief description of the contents at such location). This returned information is referred to herein as a list of files 74. The list will vary in length from being empty when nothing is found to being very long when many files are found.

At step 58 a subset 82 of the files are selected from the list. The purpose is to reduce the list to a manageable amount of data. There may be hundreds of equivalent files on the list 74. A typical number of files to include in the subset 82 is 10 or 20, although the number may vary. The manner of selecting the files for the subset is described later in a separate section.

Once the subset 82 of files is identified at step 58, then at step 60 downloading of such files is attempted and commenced. For some files, the resource may no longer be present. It is quite common for files to be moved or deleted. To improve searching performance, the search engine uses many shortcuts and speed enhancement techniques to optimize the search process. The search engine does not send a request to each computer on the network 10 to determine if the file is in fact present. As a result, when one attempts to download the file, one may receive a message, such as file not found or some similar indication that the information is no longer available at the location which is being prompted. For other files, the files are present and downloading can commence.

Downloading is performed only for a brief period of time referred to herein as the trial downloading time period. Typically this is enough time to download merely a portion of the files in the subset of files. In effect a sample of the performance of the pathway is sought for each file in the subset 82. The files are routed in packets along the global computer network. Thus, a stream of data is coming to the client computer 14. These are packets of data from the various files in the subset of files. After the trial time period the downloading bandwidth is evaluated for each file. Such bandwidth evaluation may be executed at the client computer 14 or the server computer 50.

To determine downloading bandwidth performance, the evaluating computer notes a starting time when downloading commences, then after a predetermined amount of time (i.e., trial downloading time period) checks to see how much of each file has been downloaded. The file with the most downloaded is taken to have the fastest download bandwidth performance. The specific bandwidth is the number of bytes transferred divided by the intervening time period in seconds. The evaluation is performed for one file at a time or for all files concurrently. In some embodiments the downloading is discontinued at the end of the evaluation time period. In other embodiments (e.g., one of the concurrent evaluation embodiments), the downloading of the file having the best download bandwidth performance continues, while the downloading of the other files is stopped. In an exemplary embodiment the trail downloading time period is 30 seconds. Such time period may vary from a few seconds up to one minute or higher.

According to a preferred embodiment the files are downloading concurrently. After each predetermined time interval (e.g., 3–10 seconds), downloading of the file with the slowest downloading bandwidth performance is discontinued, while that of the other files continues. As a result, a file is eliminated from consideration after each of the predetermined time intervals. According to a preferred embodiment each time interval is of the same length for each elimination of a file. In alternative embodiments the length of the time periods may vary (e.g., may get shorter or longer, preferably shorter, for subsequent iterations of eliminating a file because there are less files to consider). In one embodiment one file is eliminated after each time interval. In another embodiment multiple files may be eliminated after each interval. Such elimination method continues until only one file is left—the file having the best download bandwidth performance. Such bandwidth performance serves as the primary criteria for evaluating and screening the files in the subset of files.

There may be several criteria for selecting a file from the subset of files. One criteria is that the file is found. Those not found are eliminated from consideration. Another criteria is the bandwidth performance. The higher the bandwidth performance, the better because a higher bandwidth corresponds to a faster time for downloading the file. There may be additional criteria. For example, only stereo recordings may be desired, or downloading only from systems with a 'resume' feature may be desired. At step 62 these files are evaluated. The files not found are screened out. The files not meeting the criteria for 'stereo' or 'resume' or some other desired feature also are screened out. This screening is done automatically based on predefined fixed or user selected parameters. The remaining files then are screened for downloading bandwidth performance. The remaining file 76 with the highest bandwidth performance is selected at step 64. At step 66 the remainder or entirety of the selected file 76 is downloaded. In another embodiment, these secondary criteria, (i.e., 'stereo' or 'resume' capability), are used as tie breakers where the download bandwidth performance of two or more files is approximately the same.

According to an embodiment of this invention, a measure is maintained at the server computer 50 or some other resource on the global computer network 10 which rates the selected files. Such measure 78 is a popularity measure which counts the number of times such file has been downloaded. Specifically, the measure tracks the number of times the specific copy of the audio work is selected. Thus, it corresponds not to the audio song, but to the song/site combination. In addition, other measures also may be rated such as the number of times a title has been downloaded (i.e., any copy of the same audio work). These measures are maintained by sending a message 80 from the client computer to the server at which the measure is maintained, (e.g., a server computer). At step 68 the measure is updated at the server computer. At step 70 the file 76 is presented to the user, such as by displaying a message to the user indicating that the download is complete, by displaying the file; by playing the audio work; by displaying a message that the audio work is available to be played.

In one implementation the counter or measures 78 are maintained in one or more locations on the global computer network. Whenever a user selects a prescribed search engine to search for an audio work, a method embodiment of this invention is executed. The user's client computer sends the selected file's information to the known server computer location so that the song/site measure can be maintained.

Selecting a Subset of Files to Evaluate

As described above the initial search step 54 results in a list of files 74. Such list 74 varies in length from search to search. When searching for a popular work, the list may be very long, including hundreds of search 'hits'. As one of the purposes of this invention is to optimize the search and download time, it would be too slow to test and evaluate each file in such list. The ultimate goal is to select and download a file that meets desired criteria. To do so, a subset 82 of files are selected from the list of files 74. Each file in the subset 82 is evaluated, with one file 76 then being selected at step 64 to be downloaded at step 66. In one embodiment a first prescribed number of files or less are to be included in the subset (e.g., 10, 20 or another prescribed number). Note that when the list 74 includes such first prescribed number or less, the subset 82 includes all the files in the list of files 74. When the list 74 is larger than the first prescribed number, then acts are performed to select a number of files corresponding to the first prescribed number or less.

By maintaining the song/site counters 78 it is known that some song/site references are likely to be optimal for downloading. This is a predictor based on past performance. Thus, a portion 84 of files are placed into the subset 82 because they have a rating measure among the song/site counters 78. In one embodiment up to a second prescribed number of files may be selected into the subset 82 in this manner. If for example there are to be 6 files selected in this manner, then the 6 song/site combinations among counters 78 having the highest ranking which also are in the list of files 74 are selected to be in the subset 82. Note that each one of such 6 song/site combinations point to equivalent copies of the same audio work (as such terms 'equivalent copy' and 'same audio work' are used herein). Although the number 6 is described as an example of the second prescribed number, the actual second prescribed number may vary from embodiment to embodiment. The remaining files 86 in the subset 82 are selected at random from the list of files 74, omitting duplicates. Alternatively, a fixed number of files 86 may be selected at random from list 74, regardless of the number of files 84 identified based on there existing a song/site measure for the copy.

Meritorious and Advantageous Effects

According to one advantage of this invention, a method for selecting among equivalent files meeting some threshold criteria is provided. According to another advantage of the invention, end user waiting time is reduced because an optimally-downloadable equivalent is selected to be downloaded.

Although a preferred embodiment of the invention has been illustrated and described, various alternatives, modifications and equivalents may be used. For example, although audio files are retrieved in a preferred embodiment of this invention, other types of files may be searched for and retrieved according to the various embodiments of this invention. Therefore, the foregoing description should not be taken as limiting the scope of the inventions which are defined by the appended claims.

What is claimed is:

1. A method for selecting among files on a global computer network, comprising the steps of:

searching at least a portion of the global computer network for files meeting a search criteria, wherein a list of files meeting said search criteria is identified:

attempting to download a portion of each file among a subset of the files on said list;

screening the files attempted to be downloaded based upon selection criteria; and selecting one of the screened files attempted to be downloaded to be completely downloaded;

wherein the selection criteria includes at least a download bandwidth performance during a trial downloading time period.

2. The method of claim 1, in which the step of screening comprises:

after a first time period, evaluating the download bandwidth performance for each file having at least a portion being downloaded;

eliminating at least one file among the files being screened from consideration based on said at least one file having a slowest bandwidth performance, downloading of said eliminated file being discontinued; and repeating the steps of evaluating and eliminating after subsequent time periods until a file is identified which complies with the selection criteria and has a best download bandwidth performance.

3. The method of claim 1, in which the step of attempting comprises attempting to download a portion of each file among a subset of the files on said list for a trial downloading time period; and in which the step of screening comprises:

evaluating the downloading bandwidth performance during the trial time period for each file having at least a portion being downloaded; and identifying one file among the files being screened which complies with the selection criteria and has a best download bandwidth performance.

4. The method of claim 1, in which the step of attempting comprises attempting to download a portion of each file among a subset of the files on said list for a trial downloading time period; and in which the selection criteria comprises first criteria and second criteria, the first criteria being said download bandwidth performance during the trial downloading time period, and in which the step of screening comprises:

evaluating the downloading bandwidth performance during the trial time period for each file having at least a portion being downloaded; and identifying one file among the files being screened which complies with the second criteria and has a best download bandwidth performance.

5. The method of claim 1, in which the steps of searching, attempting, screening and selecting are executed a plurality of times to select a plurality of files, the method further comprising the steps of:

maintaining an indication of files selected during the selecting step; and prior to the step of attempting, choosing said subset of files to attempt downloading from the list of files meeting the search criteria, said step of choosing comprising identifying at random a first number of files from the list of files meeting the search criteria.

6. The method of claim 4, in which the step of choosing further comprises identifying a second number of files from the list of files meeting the search criteria that previously have been selected during the selecting step of a previous execution of the searching, attempting, screening and selecting steps.

7. The method of claim 5, in which the steps of attempting, screening and selecting are performed at one or more end user computers and the step of maintaining is performed at a server computer.

8. A method for selecting among files on a global computer network, comprising the steps of:
searching at least a portion of the global computer network for files meeting a search criteria, wherein a list of files meeting said search criteria is identified in which the list of files is a list of equivalent files;
attempting to download a portion of each file among a subset of the files on said list;
screening the files attempted to be downloaded based upon selection criteria; and
selecting one of the screened files attempted to be downloaded to be completely downloaded;
wherein the selection criteria includes at least a download bandwidth performance during a trial downloading time period.

9. The method of claim 8, in which the list of equivalent files comprises either one or both of identical and non-identical copies of a same audio work.

10. The method of claim 9, in which a first audio work and a second audio work are considered to be the same audio work where the first audio work and the second audio work are of the same song by the same artist for the same performance.

11. The method of claim 8, in which the list of equivalent files comprises either one or both of identical and non-identical copies of an audio work of a same song as performed by a same artist at either one or both of a same or a different performance.

12. The method of claim 8, in which the list of equivalent files comprises either one or both of identical and non-identical copies of an audio work of a same song as performed by either one or both of a same or a different artist at either one or both of a same or a different performance.

13. A system for searching a global computer network, comprising:
means for searching at least a portion of the global computer network for files meeting a search criteria, the searching means producing a list of files meeting said search criteria;
means for downloading a portion of a subset of files on said list;
means for screening each file attempted to be downloaded based upon selection criteria, said screening means comprising means for comparing bandwidth performance for each file of the plurality of files which has a portion downloaded; and means for selecting one of the screened files attempted to be downloaded to be completely downloaded based at least in part on the bandwidth performance associated with the selected file.

14. The system of claim 13, further comprising:
means for choosing said subset of files from the list of files, wherein at least one file from the list of files is chosen based upon a prior selection rating of such file.

15. The system of claim 14, comprising and end user computer and a server computer, wherein the end user computer comprises the downloading means, the screening means and the selecting means and wherein the server computer comprises the choosing means.

16. The system of claim 14, comprising and end user computer and a server computer, wherein the end user computer comprises the downloading means, and wherein the server computer comprises the choosing means and the comparing means.

17. The system of claim 13, in which the selection criteria comprises first criteria and second criteria, the second criteria being said bandwidth performance.

18. The system of claim 13, in which the list of files consists of a list of equivalent files of either one or both of identical and non-identical copies of a same audio work.

19. The system of claim 18, in which first and second audio works are considered to be the same audio work where the first and second audio work are of the same song by the same artist for the same performance.

20. The system of claim 13, in which the list of files consists of a list of equivalent files of either one or both of identical and non-identical copies of an audio work of a same song as performed by a same artist at either one or both of a same or a different performance.

21. The system of claim 13, in which the list of files consists of a list of equivalent files of either one or both of identical and non-identical copies of an audio work of a same song as performed by either one or both of a same or a different artist at either one or both of a same or a different performance.

22. The system of claim 13, in which the downloading means comprises:
means for downloading a portion of the subset of files on said list for a trial downloading time period.

23. The system of claim 13, in which the screening means comprises:
means for evaluating the downloading bandwidth performance for each file having at least a portion being downloaded after each one of a plurality of time periods;
means for eliminating after each one of said plurality of time periods, at least one file among the files being screened from consideration based on said at least one file having a slowest bandwidth performance.

24. The system of claim 23, in which each one of said plurality of time periods is of equal time length.

25. The system of claim 23, in which at least one of said plurality of time periods is of a different length than another one of said plurality of time periods.

* * * * *